Oct. 19, 1965 S. A. MRENNA ETAL 3,213,224
CIRCUIT INTERRUPTER AND ENCLOSURE
Filed June 7, 1963 3 Sheets-Sheet 3
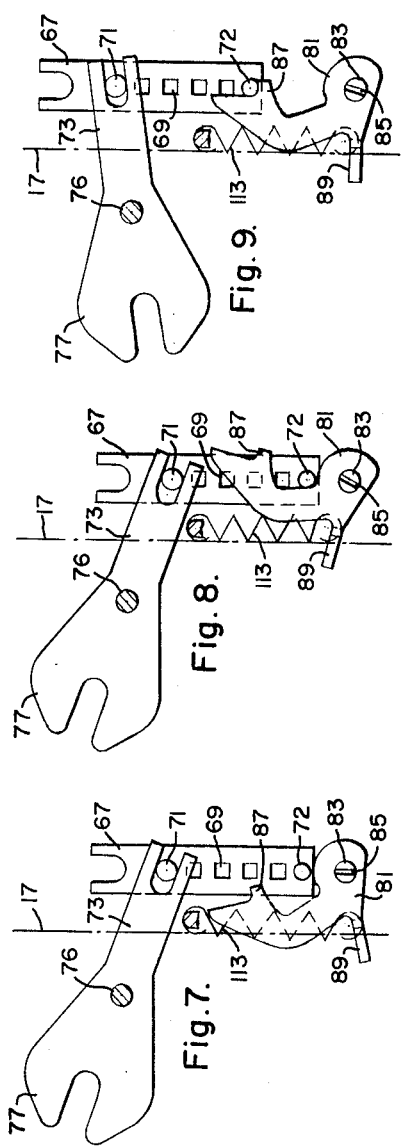
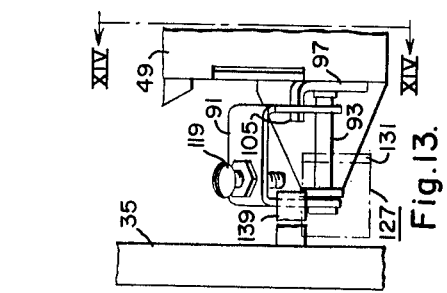
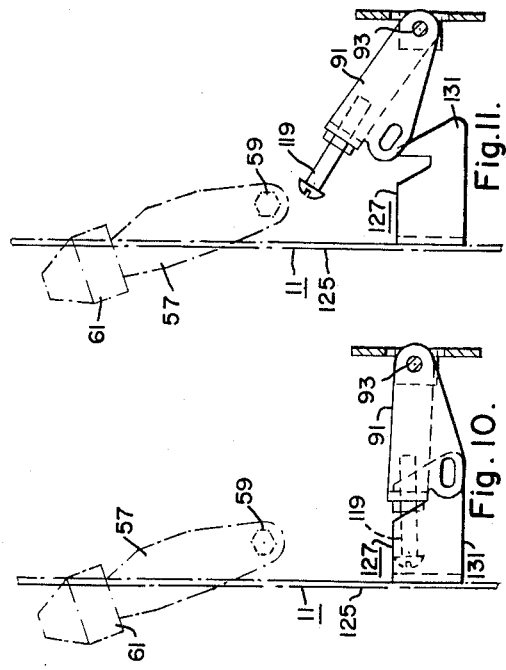

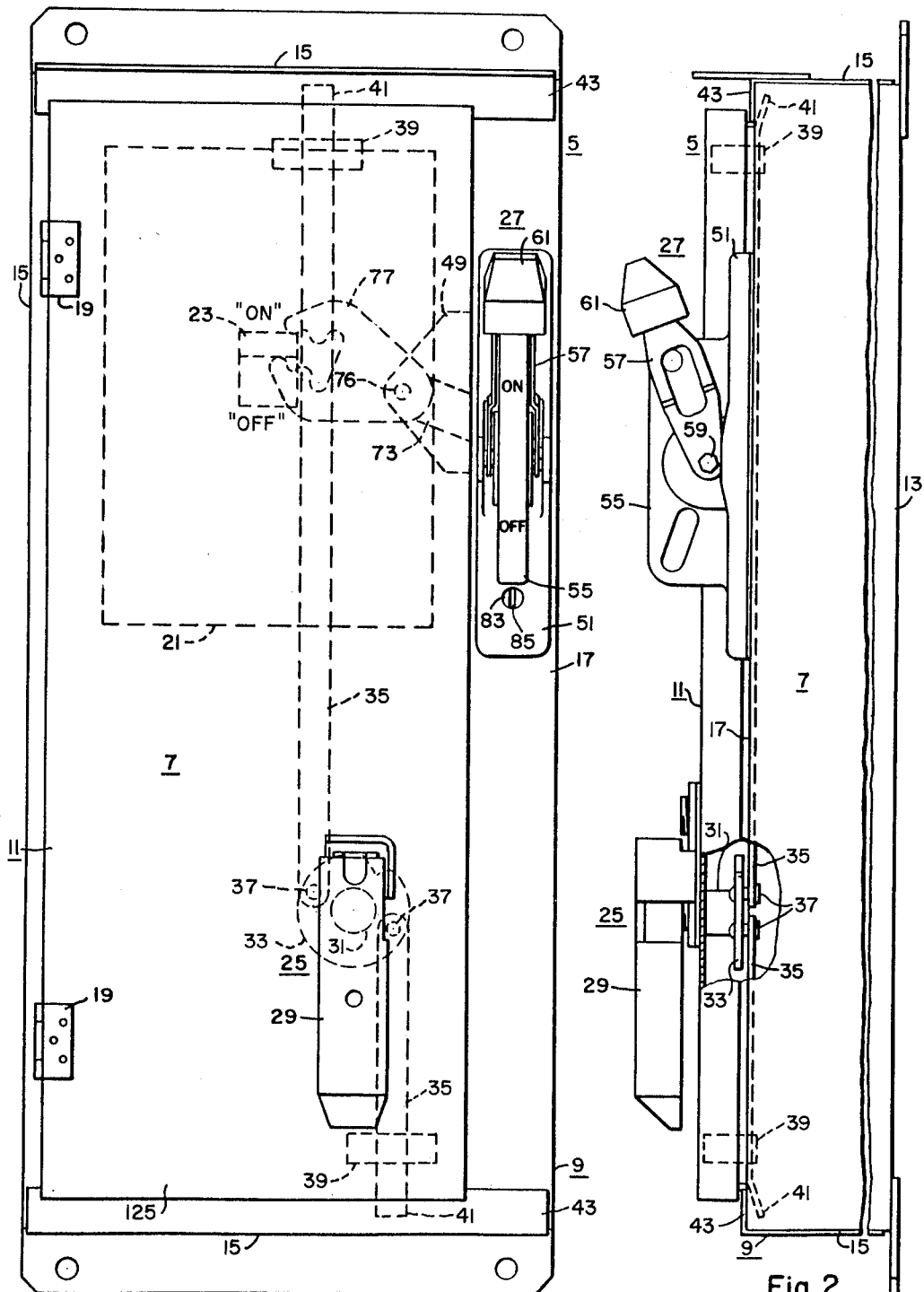

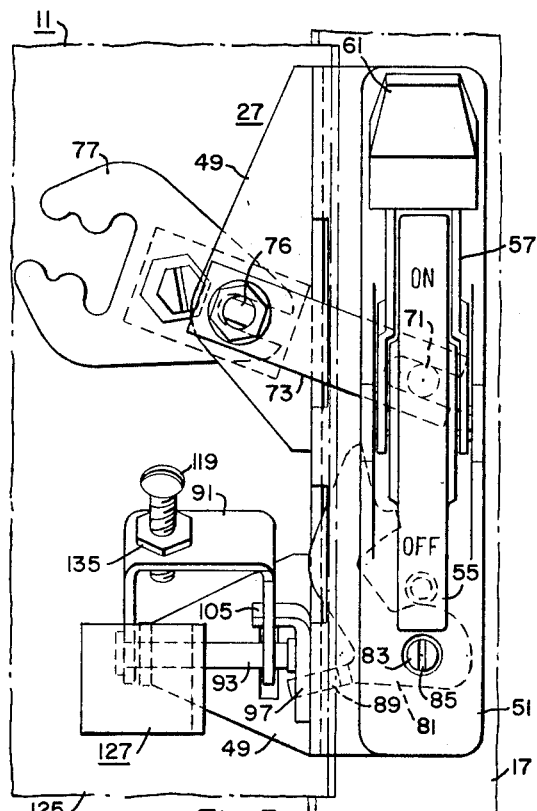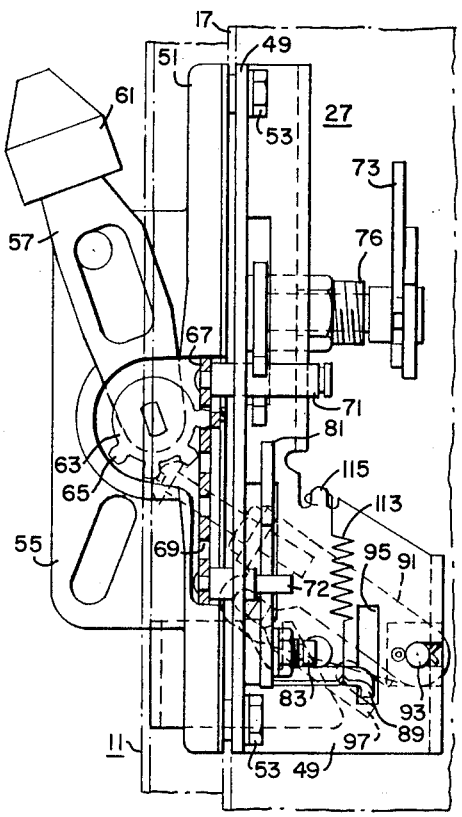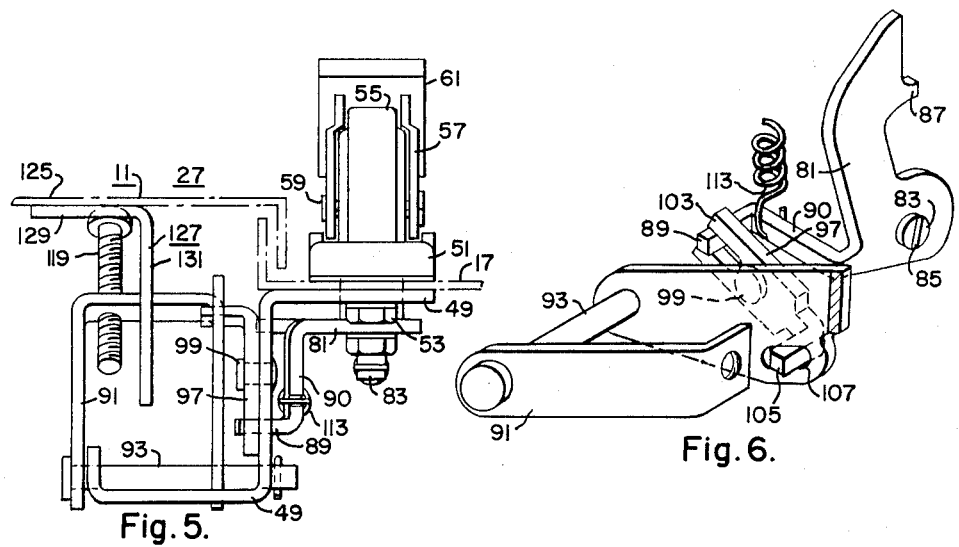

United States Patent Office 3,213,224
Patented Oct. 19, 1965

3,213,224
CIRCUIT INTERRUPTER AND ENCLOSURE
Stephen A. Mrenna and Howard E. Reichert, Brighton Township, Beaver County, Pa., assignors to Westinghouse Electric Corporation, Pittsburgh, Pa., a corporation of Pennsylvania
Filed June 7, 1963, Ser. No. 286,346
10 Claims. (Cl. 200—50)

This invention relates generally to electric control structures, and more particularly to electric control structures of the type comprising an enclosure and a circuit interrupter disposed within the enclosure with external operating means for operating the enclosed circuit interrupter.

In the art of enclosed circuit interrupters, it is desirable to have an external operating handle that extends from a fixed front part of the enclosure and is operatively connected to the enclosed circuit interrupter regardless of the position of the enclosure cover. Thus, the connection between the external handle and the enclosed circuit interrupter is not disturbed during opening and closing operations of the cover. The safety features that are commercially desirable comprise latch means automatically operable to prevent closing of the circuit interrupter when the enclosure cover is opened and latch means automatically operable to prevent opening of the cover when the enclosed circuit interrupter is closed. For some applications, means are provided for defeating one or both of the latch means. This general type of structure is disclosed in a copending patent application of Stephen A. Mrenna, Serial No. 193,402, filed May 9, 1962, and assigned to the assignee of the instant application. In the copending application, the latch means operatively interlocks with a cover-closing mechanism that is mounted on the cover and is operable upon rotation thereof to cam the cover to a fully closed position. For certain applications, it is desirable to provide to a panelboard or enclosure builder a structure that does not interlock with the cover-closing mechanism and is not necessarily operated by means of the cover-closing mechanism. Thus, the builder can mount the latching and operating mechanism on enclosures of various sizes without changing the cover-closing mechanism that he may have used on other enclosures and without having to position and align the mechanisms so that they will effectively cooperate with each other.

Accordingly, an object of this invention is to provide an improved control structure comprising an operating and latching mechanism that is operated by means of a cover structure.

Another object of the invention is to provide an improved control structure comprising an enclosure and an improved operating and latching mechanism that is mounted on the enclosure cabinet and that has an external operating handle extending from a fixed front portion of the cabinet which handle is operatively connected to an enclosed circuit interrupter regardless of the position of the enclosure cover.

Another object of this invention is to provide an improved control structure comprising an improved operating and latching mechanism that operates automatically upon pivotal opening movement of the cover to release a latching mechanism to effect latching of the operating mechanism in an "off" position.

Another object of the invention is to provide an improved control structure comprising an enclosure and an adjustable latching mechanism that is automatically operated to an unlatching position when the enclosure cover is moved to a closed position, which latching mechanism is automatically released to operate to a latching position to prevent closing of an enclosed circuit interrupter when the cover is pivoted to an open position.

A further object of the invention is to provide an improved control structure comprising an enclosure and an improved latching mechanism that operates automatically upon pivotal closing movement of the enclosure cover to move to unlatch an operating mechanism to permit free operation of the operating mechanism which latching mechanism also operates automatically upon closing of an enclosed circuit interrupter to latch the enclosure cover in the closed position.

Another object of this invention is to provide an improved control structure constructed in accordance with the immediately preceding object which control structure comprises externally accessible means for defeating the latching mechanism to permit opening of the enclosure cover when the enclosed circuit interrupter is in the closed position.

The invention, both as to structure and operation, together with additional objects and advantages thereof, will be best understood from the following detailed description when read in conjunction with the accompanying drawings.

In said drawings:

FIGURE 1 is a front elevational view of an electric control structure constructed in accordance with principles of this invention;

FIG. 2 is a side elevational view, with parts broken away, of the control structure seen in FIG. 1;

FIG. 3 is a partial plan view, with parts broken away and on an enlarged scale relative to FIG. 1, of the operating and latching mechanism of the invention;

FIG. 4 is a side elevational view of the structure seen in FIG. 3;

FIG. 5 is an end elevational view of the structure seen in FIG. 3;

FIG. 6 is a perspective view illustrating the operative connection between two of the latching members seen in FIGS. 3–5;

FIGS. 7, 8 and 9 are schematic views illustrating relative operating positions of parts of the invention;

FIGS. 10, 11 and 12 are schematic views illustrating relative operating positions of parts of the invention;

FIG. 13 is a partial plan view of parts of the latching mechanism illustrating another embodiment of the invention; and FIG. 14 is a view taken generally along the line XIV—XIV of FIG. 13.

Referring to the drawings, there is shown in FIGS. 1 and 2, a control structure 5 comprising an enclosure 7. The enclosure 7 comprises a cabinet 9 having an openable cover-structure 11 at the front thereof. The cabinet 9 comprises a planar base 13 and four side walls 15 extending normal from the base. One of the side walls 15 is bent over to form a fixed front portion 17 of the cabinet. The cover-structure 11 is pivotally supported at the front of the cabinet 9 by means of hinges 19. A circuit interrupter 21 having a handle 23 extending therefrom, is suitably mounted within the cabinet 9 on the base 13. The circuit interrupter 21 may be any of a number of types of circuit interrupters used to control an electric circuit. The enclosed circuit interrupter may be a switch, or it may be a circuit breaker of the general type shown for example, in the patent to R. C. Strother et al., Patent No. 2,937,252.

The enclosure 7 comprises cover closing means 25 attached to the cover-structure 11. The cover closing means 25 is operable to cam the cover-structure 11 to a fully closed position. The enclosure 7 also comprises an operating and latching means 27 that is attached to the fixed front portion 17 of the receptacle 9. The operating and latching means 27 is externally operable to operate the enclosed circuit interrupter 21.

The cover closing means 25 comprises a handle 29 that is pivotally supported externally on the cover structure 11 and is operable to rotate a pin 31 (FIG. 2) having a plate 33 rigidly secured to the inner end thereof. The handle 29 and plate 33 rotate as a unit. Two rods 35 are pivotally secured to the plate 33 on opposite sides of the pivot 31 by means of pins 37. The outer ends of the rods 35 are supported on the cover structure 11 by means of brackets 39. The rods 35 are provided with bent ends 41 (FIG. 2), which ends 41 engage ledges at opposite ends of the cabinet 9 to cam the cover structure 11 to the fully-closed position when the handle 29 is rotated to the cover closing position seen in FIGS. 1 and 2. When the handle 29 is rotated counterclockwise (FIG. 1), the plate 33 is rotated counterclockwise to pull the rods 35 inwardly to free the ends 41 from under the ledges 43 to permit opening of the cover structure 11.

The operating and latching means 27 (FIGS. 3–5) comprises a supporting bracket 49 disposed underneath the fixed front portion 17 of the cabinet 9 and a supporting member 51 that is disposed on the outside of the fixed-front portion 17. The members 49 and 51 are secured together and to the fixed front portion 17 of the cabinet 9 by means of two screws 53 that are threaded into the support member 51. The support member 51 has an upwardly extending portion 55 that is positioned along a plane that is generally normal to the plane of the fixed front portion 17 of the cabinet. An operating member 57, comprising two twin members that straddle the portion 55, is pivotally supported on the portion 55 by means of a pivot pin structure 59. An insulating handle 61 is provided at the free end of the operating member 57. A pinion 63 having teeth 65 thereon is supported by means of the pin structure 59 to pivotally move with the operating member 57. A rack plate 67, having a plurality of openings 69 therein, is supported on the support 51 in a suitable track so that it can slide rectilinearly back and forth in the support. The pinion 63 cooperates with the rack plate 67 to move the rack plate upon pivotal movement of the operating member 57. A pin 71 (FIG. 4) and a pin 72 are both rigidly attached to the rack plate 67 to move with the plate 67. An arm 73 (FIG. 3) having a generally U-shaped end straddling the pin 71, is pivotally supported, intermediate its ends, on the bracket 49 by means of a pivot type attachment 76. A claw structure 77 (FIG. 3) is disposed at the outer end of the arm 73 and it straddles the operating member 23 (FIG. 1) of the circuit breaker 21 to thereby operatively connect the operating means 27 with the circuit breaker 21 regardless of the position of the enclosure cover structure 11.

A latch member 81 is rigidly secured to the inner end of a pin 83 (FIG. 5) that is rotatably mounted on the support 51. The pin 83 has a slot 85 (FIG. 3) in the outer external face thereof to permit operation of the latch 81 by means of a screwdriver or other similar tool. The latch 81 has a latching portion 87 (FIG. 6) at one end thereof and a tail portion 89 bent-over at the other end thereof which tail portion is bent over at a right angle from an extension 90 that is bent over at a right angle from the main portion of the latch 81. Another latch member 91 comprises a generally U-shaped member that is pivotally supported on the bracket 49 by means of a pivot pin 93 that extends through the outer ends of the legs of the generally U-shaped latch member 91. As can be seen in FIGS. 4 and 5, the tail portion 89 of the latch 81 passes through an opening 95 in the bracket 49 to enable connection of the latch 81 with the latch 91 which members are disposed on opposite sides of a generally vertical (FIG. 5) part of the bracket 49. The latches 81 and 91 are operatively connected (FIGS. 3, 5 and 6) by means of a connecting member 97 that is pivotally supported intermediate its ends on the bracket 49 by means of a pin 99. One end 103 (FIG. 6) of the connecting member 97 is generally U-shaped and it straddles the tail portion 89 of the latch 81. The other end 105 (FIG. 6) of the connecting member 97 is bent over and it is positioned in an opening 107 in one leg of the generally U-shaped latch member 91. The connecting member 97 operatively connects the latches 81 and 91 such that when the latch 81 pivots about the axis of the pivots 83, the connecting member 97 will be pivoted about the axis of the pivot 99 that is generally normal to the direction of the axis 83, to thereby pivot the latch 91 about the axis of the pivot 93 that is generally parallel to the axis 99. A spring 113 (FIG. 4) is supported under tension at one end on a projection 115 of the bracket 49 and at the other end on the part 90 (FIG. 6) of the latch member 81 to thereby bias the latch member 81 in a clockwise (FIG. 3) direction about the pivot 83. Since the latch 81 is operatively connected to the latch 91 by means of the connecting member 97, this bias of the latch 81 in a clockwise (FIG. 3) direction effects a bias of the latch 91 in a counterclockwise (FIG. 4) direction. An adjusting screw 119 (FIGS. 3 and 5) is threadedly supported in a tapped opening in the bight portion of the generally U-shaped latch member 91.

As can be seen in FIGS. 3 and 5, the cover structure 11 comprises a generally planar cover member 125 and a hook structure 127 comprising a generally flat part 129 that is welded or otherwise secured to the cover member 125 and a hook part 131 extending generally normal to the plane of the cover member 125.

The operation of the control structure is as follows:

As is seen in FIGS. 1–5, the control structure 5 is shown with the cover structure 11 in the closed position. The external operating member 57 is in the "on" position in which position the operating member 23 of the circuit interrupter 21 is in the "on" position and the contacts of the circuit interrupter are closed. In order to open the circuit interrupter 21, the operating member 57 is rotated counterclockwise (FIG. 4) about the pivot 59. During this movement, the teeth 65 of the pinion 3) direction about the pivot 83 to move the latch member 63 engage in the notches 69 of the rack plate 67 to move the rack plate upward (FIG. 4) moving the pin 71 that is attached thereto upward. As the pin 71 moves upward, it moves the operating arm 73 counterclockwise (FIGS. 1 and 3) about the pivot 76 to toggle the operating member 23 (FIG. 1) from the "on" to the "off" position to open the contacts of the circuit interrupter.

When the cover structure 11 (FIGS. 1–5) is pivoted about the hinges 19 (FIG. 1) to the closed position seen in FIGS. 1–5, the cover member 125 engages the adjusting screw 119 (FIGS. 3 and 5) to pivot the latch member 91 in a clockwise (FIG. 4) direction about the pivot 93. This pivotal movement of the latch member 91 operates through the connecting member 97 (FIG. 6) to pivot the latch member 81 in a counterclockwise (FIGS. 3 and 7) direction to move the latch member 81 to the unlatching position seen most clearly in FIG. 7. When the latch member 81 is in the unlatching position seen in FIG. 7, the latch part 87 thereof is free and out of the path of the pin 72 that is attached to the rack plate 67 so that the rack plate 67 is free to reciprocate rectilinearly upon reciprocal movement of the operating member 57 to thereby effect opening and closing operations of the enclosed circuit interrupter.

If the circuit interrupter is in the "off" position and the cover structure 11 is pivoted to the open position, the cover member 125 (FIGS. 3 and 5) moves away from the screw 119 to release the latch member 91. Since the latch members 91 and 81 are operatively connected by means of the connecting member 97 (FIG. 6) when the latch member 91 is released, the spring 113 (FIGS. 4 and 7) biases the latch member 81 in a clockwise (FIG. 3) direction about the pivot 83 to move the latch member 81 to the latching position in which it is seen in FIG. 9. When the latch member 81 is moved to the latching position seen in FIG. 9, the latch part 87 thereof engages the pin 72 that is attached to the rack plate 67 to prevent downward (FIG. 9) movement of the rack plate 67 to thereby prevent a closing operation of the enclosed circuit interrupter 21. With the cover structure open, a workman, by making a definite attempt to defeat the latching mechanism can reach in and pivot the member 91 to thereby pivot the latch 81 in a counterclockwise (FIG. 9) direction against the bias of the spring 113 to move the latch part 87 out of the position latching the pin 72 and, while holding the member 81 in the unlatching position with one hand he can move the operating member 57 (FIGS. 1 and 2) with the other hand to operate the circuit interrupter to the "on" position.

If the circuit interrupter 21 is in the "on" position with the cover-structure 11 open, the parts will be in the positions in which they are seen in FIG. 8. With the parts in the positions seen in FIG. 8, a worker can operate the operating member 57 (FIGS. 1 and 2) to operate the circuit interrupter 21 to the "off" position. During this movement, the rack plate 67 (FIG. 8) moves upward and the pin 72 engages the underside of the latch part 87 of the latch member 81 and cams this member in a counterclockwise direction against the bias of the spring 113 to thereby move the member 81 out of latching position. When the enclosed circuit interrupter 21 is closed the spring 113 moves the latch member 81 to the latching position seen in FIG. 9 to prevent a closing operation of the circuit interrupter.

In addition to automatically latching and unlatching the operating mechanism to prevent and permit operation of the enclosed circuit interrupter 21 in dependence upon the position of the cover structure 11, means are provided to automatically latch and unlatch the cover structure 11 in the closed position in dependence upon the position of the enclosed circuit interrupter 21.

With the circuit interrupter in the "on" position and the cover structure 11 in the closed position, the parts are in the positions seen in FIG. 7. If an attempt is made to open the cover structure 11, the cover member 125 (FIGS. 3 and 5) will be moved away from the adjusting screw 119 and the spring 113 (FIG. 7) will operate to rotate the latch member 81 in a clockwise (FIG. 7) direction. This movement, moves the connecting member 97 (FIG. 6) to move the latch member 91 in a counterclockwise (FIG. 10) direction and, because the cover structure 11 has moved upward a short distance, the bight portion of the generally U-shaped latch member 91 falls into the notch in the hook member 131 to prevent further opening movement of the cover structure 11. The latch member 91 can move to this latching (FIG. 10) position because the circuit interrupter 21 (FIG. 1) is closed and the pin 72 (FIG. 8) is positioned to permit movement of the latch member 81 to the position in which it is seen in FIG. 8. Thus, when the circuit interrupter is in the "on" or closed position, and an attempt is made to open the cover structure 11, the latch member 91 will engage in the notch in the hook member 131 to prevent opening movement of the cover structure 11.

Means are provided for defeating the latching mechanism to permit opening of the cover structure 11 when the enclosed circuit interrupter 21 is closed. With the cover structure 11 closed and the enclosed circuit interrupter 21 in the "on" or closed position and an attempt is made to open the cover, the latch member 91 will be in the cover latching position seen in FIG. 10 and the member 81 will be in the position seen in FIG. 8. A worker can insert a screwdriver into the externally accessible slot 85 in the pin 83 and rotate the latch member 81 counterclockwise (FIG. 8) against the bias of the spring 113. This movement, through the connecting member 97 (FIG. 6) pivots the latch member 91 in a clockwise (FIG. 10) direction about the pivot 93 to move the bight portion of the latch member 91 out of the notch in the hook member 131 to thereby free the cover structure 11 and permit opening movement of the cover structure 11.

If the cover structure 11 is thereafter pivoted to the closed position with the circuit interrupter "on," the lower portion of the hook member 131 will cam the member 91 out of the way to permit closing of the structure 11. Thereafter, the cover structure 11 will be latched in the same manner hereinbefore described.

When the enclosed circuit interrupter 21 is in the "off" or open position, the cover structure 11 can be freely moved to the open position. When the enclosed circuit interrupter is in the "off" position and the cover structure 11 is pivotally moved toward the open position, the cover member 125 will move away from the screw 119 (FIGS. 3 and 5) releasing the latching member 91, and the spring 113 (FIG. 9) will pivot the latch member 91 in a counterclockwise direction from the position seen in FIG. 11 to the unlatching position seen in FIG. 12. As can be seen in FIG. 12, the latch member 91 is stopped short of the position wherein the bight portion thereof moves into the notch of the hook member 131. The latch member 91 is stopped in the unlatching position seen in FIG. 12 because the circuit interrupter is "off" and the rock plate 67 is in the position seen in FIG. 9 in which position the pin 72 engages the latch part 87 of the latch 81 to limit clockwise (FIG. 9) movement of the member 81 to thereby limit counterclockwise (FIG. 12) latching movement of the latch member 91. Thus, when the circuit interrupter 21 is open the cover structure 11 can be freely moved to the open position.

The operating and latching mechanism 27 can be readily adapted to cooperate with the door handle closing mechanism 25. This is done by rotating the adjusting screw 119 (FIGS. 3 and 5) downward to an inactive position in which position the screw 119 will not be engaged by the cover member 125 when the cover structure 11 is pivoted to the closed position. With the adjusting screw 119 in an inactive position, an extension 139 (FIG. 13) is attached to the upper latch rod 35 (FIGS. 1, 2, 13 and 14) to cooperate the latch member 91. The operation of the embodiment illustrated in FIGS. 13 and 14 is the same as the hereinbefore described operation of the embodiment of FIGS. 1–12 except that the latches 91 and 81 are operated by means of the cooperation of the latch 91 with the extension 139 (FIGS. 13 and 14) upon rotative operation of the cover-closing mechanism 25 (FIGS. 1 and 2) rather than by means of the cooperation of the adjusting screw 119 (FIGS. 3 and 5) of the latch 91 with the cover member 125 of the cover structure 11 upon pivotal movement of the cover structure 11.

If the enclosed circuit interrupter is a circuit breaker of the type shown, for example, in the aforementioned patent to R. C. Stroether et al. Patent No. 2,937,252, the breaker will automatically trip open in response to an overload current condition irrespective of the "on" position of the handle. The breaker can thereafter be reset by moving the external operating member 57 to the full "off" position. During this movement, the operating member 23 of the circuit breaker 21 will be moved to the full "off" position to reset the circuit breaker in a manner well known in the art and described in the above-mentioned patent. Thereafter, the breaker can be operated in the same manner hereinbefore described.

From the foregoing, it can be understood that there is provided by this invention an improved electric control structure comprising an enclosure and a circuit interrupter mounted within the enclosure. Adjustable latching means, operable by engagement thereof with the enclosure cover, is provided to automatically latch the circuit interrupter "off" when the cover is opened and to automatically latch the cover closed when the circuit interrupter is operated to the "on" position. The latching means is defeatable to permit operation of the circuit interrupter to the "on" position when the cover is open and defeatable to permit opening of the cover when the circuit interrupter is in the "on" position. The mechanism is easily assembled since an enclosure builder need only mount the operating and latching mechanism on the cabinet and secure one hook member to the enclosure cover. The latching means, which in the preferred embodiment operates independently of the cover-handle closing mechanisms, can be readily adjusted for effective operation by operating an adjusting screw that is threadedly supported on one of the latch members. The latching mechanism is readily convertible to a structure operable by means of the cover-handle closing mechanism by merely screwing the adjusting screw to an inactive position and placing an extension on one of the latch rods of the cover-handle closing mechanism to perform the functions of the adjusting screw.

With the latching mechanism mounted on a fixed front portion of the cabinet, the operating handle is operatively connected to the enclosed circuit interrupter regardless of the position of the enclosure cover. The rack-and pinion operating mechanism comprises an operating handle that moves in a plane generally normal to the plane of the closed cover. Thus, adequate leverage of the external operating handle is effected without having the handle extend past the front-elevational-view dimensions of the enclosure and the width-wise dimension of the fixed front stationary part of the enclosure is kept relatively small so that the enclosure opening can be relatively large.

Since numerous changes may be made in the above described construction, and different embodiments of the invention can be made without departing from the spirit and scope of the invention, it is intended that all matter contained in the foregoing description or shown in the accompanying drawings shall be interpreted as illustrated and not in a limiting sense.

We claim as our invention:

1. In combination, an enclosure comprising a cabinet, a cover structure, means supporting said cover structure on said cabinet to open at the front of said cabinet, a circuit interrupter mounted within said cabinet and having an operating member movable to open and close the interrupter, said cabinet comprising a fixed front portion, an operating structure comprising an external operating handle extending from said fixed front portion, means continuously connecting said operating structure to said operating member regardless of the position of said cover structure, a latching structure mounted on said cabinet, upon opening movement of said cover structure said cover structure releasing said latching structure whereupon said latching structure is operated to a position to prevent closing movement of said operating structure to thereby prevent closing of said circuit interrupter, upon closing movement of said cover structure said cover structure at a position engaging said latching structure and thereafter moving to operate said latching structure to an unlatching position to permit free operation of said operating structure to thereby permit free operation of said circuit interrupter, and adjusting means operable to adjust the position of engagement of said cover structure with said latching structure.

2. In combination, an enclosure comprising a cabinet having a fixed front portion and an opening at the front thereof, a cover structure, means supporting said cover structure on said cabinet such that said cover structure can be moved to open and close said opening, a circuit interrupter mounted within said cabinet and having a movable operating member for opening and closing the interrupter, an operating structure comprising an external operating handle extending from said fixed front portion, means connecting said operating structure to said operating member continuously regardless of the position of said cover structure, a latching structure mounted on said cabinet and comprising a threadedly supported member, upon opening movement of said cover structure said cover structure releasing said threadedly supported member to effect operation of said latching structure to a position preventing closing movement of said operating structure to thereby prevent closing of said circuit interrupter, upon closing movement of said cover structure said cover structure at a position engaging said threadedly supported member and thereafter moving to operate said latching structure to an unlatching position to permit free operation of said operating structure to thereby permit free operation of said circuit interrupter, and said threadedly supported member being rotatable to move axially to vary the position of engagement of said cover structure with said threadedly supported member.

3. In combination, an enclosure comprising a cabinet, a cover structure, means movably supporting said cover structure on said cabinet, a circuit interrupter mounted within said cabinet and having a movable operating member for opening and closing the interrupter, an operating structure mounted on said cabinet and having an external operating handle, means operatively connecting said operating handle with said enclosed operating member regardless of the position of said cover structure, said cover structure comprising a cover member and a hook member supported on said cover member, a latching structure mounted on said cabinet, upon opening movement of said cover structure said cover member releasing said latching structure whereupon said latching structure moves to a latching position to prevent closing movement of said operating structure to thereby prevent closing of said circuit interrupter, upon closing movement of said cover structure said cover member engaging said latching structure to operate said latching structure to an unlatching position to permit free operation of said operating structure to thereby permit free operation of said circuit interrupter, when said cover structure is closed and said operating structure is operated to close said circuit interrupter said latching structure being automatically operated such that upon opening movement of said cover structure said latching structure will latch said hook member to prevent opening of said cover structure.

4. In combination, an enclosure comprising a cabinet, an openable cover structure, means supporting said cover structure for movement on said cabinet, a circuit interrupter mounted within said cabinet and having an operating movable member movable to open and close the interrupter, an operating structure mounted on said cabinet and having an external operating handle, means operatively connecting said operating handle with said enclosed operating member regardless of the position of said cover structure, said cover structure comprising a cover member and a hook member supported on said cover member, a latching structure mounted on said cabinet, upon opening movement of said cover structure said cover member releasing said latching structure whereupon said latching structure is operated to a latching position to prevent closing movement of said operating structure to thereby prevent closing of said circuit interrupter, upon closing movement of said cover structure said cover member engaging said latching structure to operate said latching structure to an unlatching position to permit free operation of said operating structure to thereby permit free operation of said circuit interrupter, when said cover structure is closed and said operating structure is operated to close said circuit interrupter said latching structure being automatically operated such that upon opening movement of said cover structure said latching structure will latch said hook member to prevent opening of said cover structure, and externally accessible means operable to defeat said latching structure to permit opening of said cover structure when said circuit interrupter is closed.

5. In combination, an enclosure comprising a cabinet, a cover structure, means supporting said cover structure for movement on said cabinet, a circuit interrupter mounted within said cabinet and having a movable operating member for opening and closing the interrupter, an operating structure mounted on said cabinet and comprising an external operating handle, means operatively connecting said operating handle with said enclosed operating member regardless of the position of said cover structure, said cover structure comprising a cover member and a hook member supported on said cover member, a latching structure mounted on said cabinet, upon opening movement of said cover structure said cover member releasing said latching structure, to effect operation of said latching structure to a latching position to prevent closing movement of said operating structure to thereby prevent closing of said circuit interrupter, upon closing movement of said cover structure said cover member at a position engaging said latching structure and thereafter moving to operate said latching structure to an unlatching position to permit free operation of said operating structure to thereby permit free operation of said circuit interrupter, adjusting means for adjusting said latching structure to adjust the position of engagement for said latching structure with said cover member during closing movement of said cover structure, when said cover structure is closed and said operating structure is operated to close said circuit interrupter said latching structure being automatically operated such that upon opening movement of said cover structure said latching structure will latch said hook member to prevent opening of said cover structure.

6. In combination, an enclosure comprising a cabinet, a cover structure, means supporting said cover structure for movement on said cabinet, a circuit interrupter mounted within said cabinet and having a movable operating member for opening and closing the interrupter, an operating structure mounted on said cabinet and comprising an external operating handle, means operatively connecting said external operating handle with said enclosed operating member regardless of the position of said cover structure, said cover structure comprising a cover member and a hook member supported on said cover member, a latching structure mounted on said cabinet, upon opening movement of said cover structure said cover member releasing said latching structure to effect operation of said latching structure to a latching position to prevent closing movement of said operating structure to thereby prevent closing of said circuit interrupter, upon closing movement of said cover structure said cover member at a position engaging said latching structure and thereafter moving to operate said latching structure to an unlatching position to permit free operation of said operating structure to thereby permit free operation of said circuit interrupter, said latching structure comprising a threadedly supported adjusting member rotatable to adjust the position of engagement of said latching structure with said cover member upon closing movement of said cover structure, when said cover structure is closed and said operating structure is operated to close said circuit interrupter said latching structure being automatically operated such that upon opening movement of said cover structure said latching structure will latch said hook member to prevent opening of said cover structure, and externally accessible means operable to defeat said latching structure to permit opening of said cover structure when said circuit interrupter is closed.

7. In combination, an enclosure comprising a cabinet having a fixed front portion, a cover structure, means mounting said cover structure on said cabinet for movement to opened and closed positions at the front of said cabinet, a circuit interrupter mounted within said cabinet and having a movable operating member for opening and closing the interrupter, an operating structure comprising an external operating handle extending from said fixed front portion, means operatively connecting said operating structure with said operating member regardless of the position of said cover structure, said cover structure comprising a generally flat cover member disposed along a plane when said cover structure is in the closed position, a hook member extending from said cover member, a latching structure mounted on said cabinet and comprising a first latch member pivotally supported to move about an axis generally normal to said plane, a second latch member pivotally supported to move about an axis generally parallel to said plane, means operatively connecting said first and second latch members, biasing means, when said cover structure is operated to effect opening thereof said biasing means will operate said latching structure to move said first latch member to a position latching said operating structure to prevent closing of said circuit interrupter, upon a closing operation of said cover structure said cover structure operating said latching structure to move said first latch member to a position unlatching said operating structure to permit closing of said circuit interrupter, when said circuit interrupter is closed said operating structure being positioned such that when an attempt is made to open said cover structure said biasing means will operate said latching structure such that said second latch member will engage said hook member to prevent opening movement of said cover structure, when said circuit interrupter is open said operating structure being positioned to engage said first latch member to limit latching movement of said second latch member to thereby prevent said second latch member from latching said hook to thereby enable opening of said cover structure.

8. In combination, an enclosure comprising a cabinet having a fixed front portion, a cover structure, means mounting said cover structure on said cabinet for movement to opened and closed positions at the front of said cabinet, a circuit interrupter mounted within said cabinet and having a movable operating member for opening and closing the interrupter, an operating structure comprising an external handle extending from said fixed front portion, means operatively connecting said operating structure with said operating member regardless of the position of said cover structure, said cover structure comprising a generally flat cover member disposed along a plane when said cover structure is in the closed position, a hook member extending from said cover member, a latching structure mounted on said cabinet and comprising a first latch member pivotally supported to move about an axis generally normal to said plane, a second latch member pivotally supported to move about an axis generally parallel to said plane, means operatively connecting said first and second latch members, biasing means, when said cover structure is operated to effect opening thereof said biasing means operating said latching structure to automatically move said first latch member to a position latching said operating structure to prevent closing of said circuit interrupter, upon a closing operation of said cover structure said cover structure operating said latching structure to move said first latch member to a position unlatching said operating structure to permit closing of said circuit interrupter, when said circuit interrupter is closed said operating structure being positioned such that when an attempt is made to open said cover structure said biasing means will operate said latching structure such that said second latch member will engage said hook to prevent opening of said cover structure, when said circuit interrupter is open said operating structure being positioned to engage said first latch member to limit latching movement of said second latch member to thereby prevent said second latch member from latching said hook to thereby enable opening of said cover structure, and externally accessible defeating means manually operable when said cover is closed and said circuit interrupter is closed to defeat said latching structure to permit opening of said cover structure.

9. In combination, an enclosure comprising a cabinet, a cover structure, means supporting said cover structure on said cabinet to open at the front of said cabinet, a circuit interrupter mounted within said cabinet and having a movable operating member for opening and closing the interrupter, an operating structure mounted on said cabinet and comprising an external operating handle, means operatively connecting said operating structure to said operating member regardless of the position of said cover structure, said cover structure compising a generally flat cover member disposed along a plane when said cover is closed and a hook member extending from said cover member, a latching structure mounted on said cabinet and comprising a first latching device pivotally supported to move about an axis that is generally normal to said plane, a second latching device pivotally supported to move about an axis that is generally parallel to said plane, means operatively connecting said first and second latching devices, biasing means, upon closing movement of said cover structure said cover member at a position engaging said second latching device and thereafter moving to operate said latching structure to move said first latching device to an unlatching position to permit free operation of said operating structure, adjusting means operable to adjust the position of engagement of said second latching device with said cover member when said cover structure is moved to the closed position, upon opening movement of said cover structure said cover member releasing said second latching device whereupon said biasing means operates to move said first latching device to a latching position to prevent closing of said circuit interrupter, when said circuit interrupter is closed and said cover structure is closed and an attempt is made to open said cover structure said biasing means operating to move said latching structure such that said second latching device engages said hook member to prevent opening of said cover structure.

10. In combination, an enclosure comprising a generally planar base and sidewalls and having an opening therein opposite said base, an openable cover structure closing said opening and disposed generally parallel to said base, a circuit interrupter mounted within said cabinet and comprising an operating member movable to open and close the interrupter, said cabinet having a fixed front portion adjacent said opening and disposed generally parallel to said base, an operating structure mounted on said fixed front portion and comprising a rectilinearly movable rack plate, a pinion operable to rectilinearly move said rack plate, an external operating handle extending from said fixed front portion movable along a plane generally normal to the plane of said base to operate said operating structure to open and close said circuit interrupter, said cover structure comprising a cover member and a hook member extending from said cover member, a latching structure mounted on said cabinet and comprising a first latching device pivotally supported to move about an axis generally normal to said base, a second latching device pivotally supported to move about an axis generally parallel to said base, means operatively connecting said first and second latching devices, upon closing movement of said cover structure said cover member at a position engaging and thereafter moving said second latching device to effect movement of said first latching device to an unlatching position to permit free operation of said circuit interrupter, said second latching device being adjustable to adjust the position of engagement of said cover member with said second latching device, biasing means, upon opening movement of said cover structure said cover member releasing said second latching device whereupon said biasing means operates to bias said first latching device into a latching position to prevent rectilinear movement of said rack plate to thereby prevent closing of said circuit interrupter, when said circuit interrupter is closed and an attempt is made to open said cover structure said biasing means operating to move said second latching device to a position in latching engagement with said hook member to thereby prevent opening of said cover structure, externally accessible defeating means manually operable when said cover is closed and said circuit interrupter is closed to defeat said latching structure to permit opening of said cover structure, when said cover structure is closed and said circuit interrupter is open said operating structure being positioned to limit latching movement of said latching structure to prevent said second latching device from latching said hook member to thereby permit said cover to be freely opened.

References Cited by the Examiner

UNITED STATES PATENTS 3,059,072  10/62  Mekelburg et al. _____ 200—50

KATHLEEN H. CLAFFY, *Primary Examiner.*

BERNARD A. GILHEANY, *Examiner.*